United States Patent [19]

Inaba

[11] Patent Number: 4,781,872
[45] Date of Patent: Nov. 1, 1988

[54] METHOD OF MOLD OPENING/CLOSING SPEED CONTROL

[75] Inventor: Yoshiharu Inaba, Kawasaki, Japan

[73] Assignee: Fanuc LTD., Minamitsuru, Japan

[21] Appl. No.: 80,569

[22] Filed: Jul. 31, 1987

Related U.S. Application Data

[62] Division of Ser. No. 752,621, Jul. 8, 1985, Pat. No. 4,696,632.

[30] Foreign Application Priority Data

Dec. 28, 1983 [JP] Japan .................................. 58-245421
Dec. 26, 1984 [WO] World Int. Prop.
O. .......................... PCT/JP84/00618

[51] Int. Cl.$^4$ .............................................. B29C 45/80
[52] U.S. Cl. .................................. 264/40.5; 264/40.7
[58] Field of Search ................. 425/25, 135, 150, 162, 425/167, 169, 171, 451, 451.2, 590; 264/40.1, 40.5, 40.7, 294, 328.1, 328.7

[56] References Cited

U.S. PATENT DOCUMENTS

| | | | |
|---|---|---|---|
| 3,616,495 | 11/1971 | Lemelson | 425/162 |
| 3,857,658 | 12/1974 | Muzsnay | 425/451.2 |
| 4,195,048 | 3/1980 | Jung | 264/40.5 |
| 4,409,650 | 10/1983 | Noguchi | 901/5 |
| 4,540,359 | 9/1985 | Yamazahi | 425/135 |
| 4,563,744 | 1/1986 | Tsuboi | 425/149 |

FOREIGN PATENT DOCUMENTS 53-3418 2/1978 Japan .
55-124632 9/1980 Japan .

Primary Examiner—Jan H. Silbaugh
Assistant Examiner—Jill L. Heitbrink
Attorney, Agent, or Firm—Staas & Halsey

[57] ABSTRACT

A method of mold opening/closing speed control wherein an opening/closing speed switching position for molds in a mold clamping unit in an injection molding apparatus can be taught by a control device. The control device is set in a teaching mode (101), a servo motor (M) is driven at a low speed to move (102) the molds, speed switching position P1, P2 and P3 are stored (103, 104, 205, 106, 109) by a teaching device and opening/closing speed control of the molds is performed (110, 123) by the servo motor in accordance with the stored positions.

14 Claims, 2 Drawing Sheets

METHOD OF MOLD OPENING/CLOSING SPEED CONTROL

This is a divisional of co-pending application Ser. No. 752,621 filed on July 8, 1985, now U.S. Pat. No. 4,696,632.

BACKGROUND OF THE INVENTION

The present invention relates to a mold opening/closing speed control device in an injection molding apparatus and, more particularly, to a mold opening/closing speed control device wherein a carrier acceleration/deceleration position, determined by a mold clamping mechanism for opening/closing molds, is numerically taught and stored in the control device.

In mold opening/closing speed control of a mold clamping mechanism in a conventional injection molding apparatus, a limit switch, a proximity switch; or the like is arranged at an acceleration/deceleration position to control a mold opening/closing speed. For this reason, the position of the limit switch, the proximity switch or the like must be precisely adjusted. As a result, reliability of such a switch determines the reliability of the control device itself, resulting in inconvenience.

SUMMARY OF THE INVENTION

It is, therefore, an object of the present invention to solve the conventional problem and provide a mold opening/closing speed control device which does not empty a switch such as a limit switch, and which is used in an injection molding apparatus.

It is another object of the present invention to provide a mold opening/closing control device in an injection molding apparatus, wherein an acceleration/deceleration position of a mold opening/closing speed can be numerically taught.

In order to achieve the above objects of the present invention, there is provided a mold opening/closing speed control device in an injection molding apparatus, comprising teaching/operation mode selecting means for selecting one of a teaching mode for teaching an acceleration/deceleration position of a mold opening/closing speed and an operation mode for opening/closing molds; teaching means for instructing the acceleration/deceleration position; memory means for storing the acceleration/deceleration position; mold driving means for moving the molds; and position detecting means for detecting a moving position of the molds; and control means for, in the teaching mode, causing the mold driving means to move the molds at a low speed and storing in the memory means a mold position detected by the position detecting means in response to an instruction from the teaching means, and for, in the operation mode, changing the opening/closing speed of the molds in accordance with the mold position stored in the memory means.

According to the present invention, the acceleration/deceleration position of the opening/closing speed of the molds can be arbitrarily taught, and a position for changing the mold opening/closing speed can be easily set even if the molds are replaced with other molds, thereby providing optimal mold opening/closing speed control for the corresponding molds. Unlike the conventional control device, an installation position of the limit switch or the like need not be adjusted, and operation can be simplified.

DETAILED DESCRIPTION OF THE PREFERRED EMBODIMENT

The present invention will be described in detail with reference to the accompanying drawings.

Figure 1:
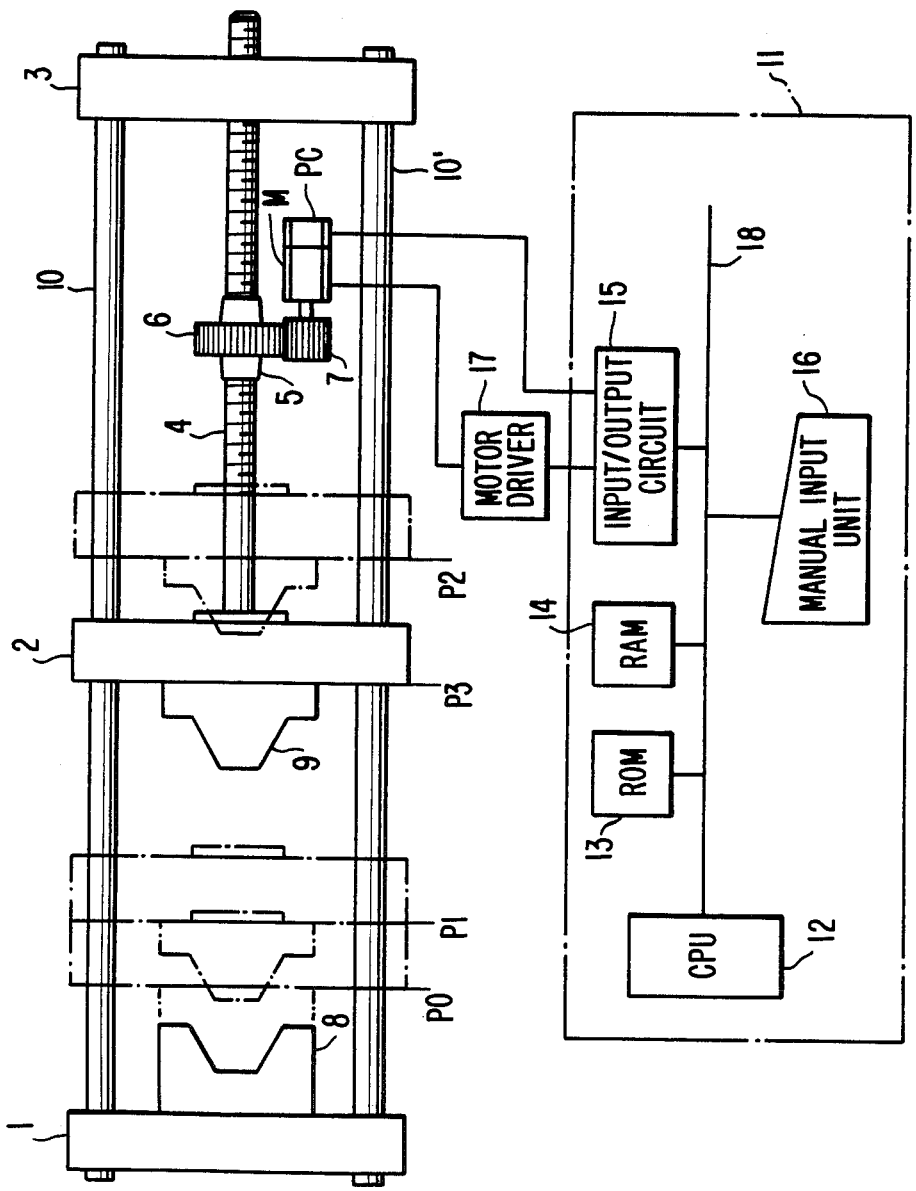
FIG. 1 is a block diagram of a mold opening/closing speed control device according to an embodiment of the present invention.

FIG. 1 shows a mold opening/closing speed control device according to an embodiment of the present invention. Reference numerals 1 and 3 denote bases; and 2, a carrier. Molds 8 and 9 are mounted on the base 1 and the carrier 2, respectively. A ball screw 4 is fixed on the carrier 2. A nut 5 threadably engaged with the ball screw 4, a gear 6 integrally formed with the nut 5, a gear 7 meshed with the gear 6, and a servo motor M for driving the gear 7 constitute a mold driving means. The carrier 2 is moved by the mold driving means in the right-and-left direction of FIG. 1.

Reference numerals 10 and 10' denote tie bars. Reference symbol PC denotes a position sensor serving as a position detecting means for detecting a rotational position of the servo motor M. Reference numeral 11 denotes a controller for controlling a rotational speed (i.e., a mold opening/closing speed by the carrier 2) of the servo motor M; 12, a central processing unit (to be referred to as a CPU hereinafter); 13, a ROM for storing a control program for controlling the overall operation of the control device; and 14, a RAM, i.e., a memory means for storing processed results and an acceleration/deceleration position (to be described later) of the carrier 2. Reference numeral 15 denotes an input/output circuit which is connected to a motor driver 17 for the servo motor M, and to the position sensor PC. Reference numeral 16 denotes a manual input unit which has a selection switch serving as a teaching/operation mode selecting means for selecting a teaching or operation mode and a switch of a teaching means for teaching a teaching point. Reference numeral 18 denotes a bus.

Referring to FIG. 1, reference symbols P0 to P3 denote acceleration/deceleration positions of the carrier 2, respectively. The position P0 represents a closing position of the molds 8 and 9. The position P1 represents a position where the molds 8 and 9 are opened to be no longer in contact with each other and slightly separated from each other. The position P2 represents an open position of the molds 8 and 9 while the carrier 2 is stopped. The position P3 represents an acceleration/deceleration switching position of the carrier 2. In operation, the carrier 2 is moved at a low speed between the positions P0 and P1 and between the positions P2 and P3. The carrier 2 is moved at a high speed between the positions P1 and P3.

The operation of the mold opening/closing speed control device will now be described in detail.

Teaching processing will be described wherein the acceleration/deceleration positions P0 to P3 are taught in the controller 11.

Figure 2A:
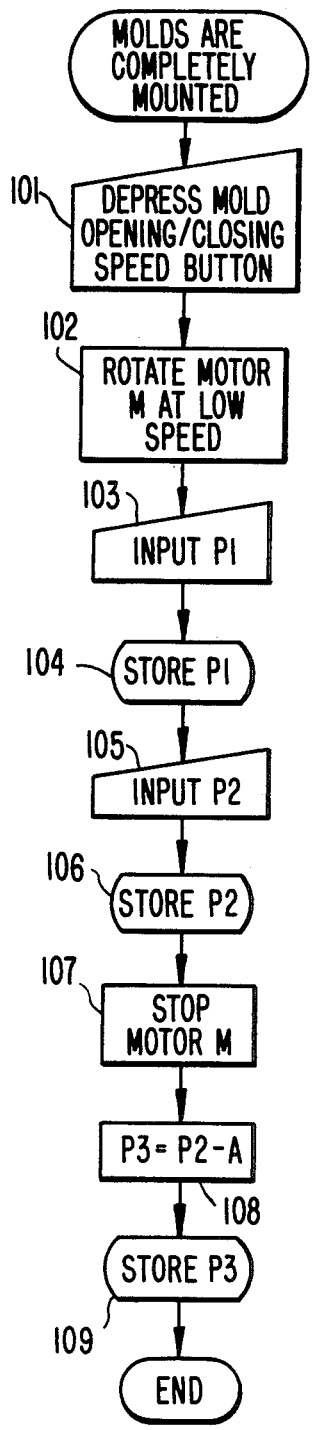
FIGS. 2(a), 2(b) and 2(c) are flow charts for explaining the operation of the device of FIG. 1.

FIG. 2(a) is an operation flow chart for explaining teaching processing. The molds 8 and 9 are mounted on the base 1 and the carrier 2, respectively, and are closed. A mold opening/closing speed button in the teaching/operation mode selecting means in the manual input unit 16 is depressed to set the teaching mode (step 101).

The CPU 12 causes the servo motor M to rotate at a low speed through the input/output circuit 15 and the motor driver 17, thereby moving the carrier 2 to the right in FIG. 1 (step 102). When the molds 8 and 9 are opened to be no longer in contact with each other and slightly separated from each other, that is, when the carrier 2 is located at the position P1, an operator depresses a position input key or the like as the teaching means on the manual input unit 16 to generate a P1 position storage instruction (step 103). The CPU 12 stores the P1 position in the RAM 14 in response to a signal from the position sensor PC (step 104). When the carrier 2 is further moved and stopped at the position P2, a position storage instruction is entered again (step 105), and the stop position P2 is stored in the RAM 14 (step 106). The motor M is then stopped (step 107). At the same time, the CPU 12 subtracts from the stop position P2 a constant A which is determined by inertia of the servo motor M and the mold clamping unit and which is already stored during manufacturing to obtain an acceleration/deceleration position P3 (step 108). The position P3 is stored in the RAM 14 (step 109). As a result, all the acceleration/deceleration positions P0 to P3 are stored in the RAM 14. In this embodiment, the position P0 representing the closing point of the molds serves as the origin. If the origin is to be stored, the teaching mode is set and the position P0 is stored. Thereafter, the servo motor M is driven.

The above operations are performed in the teaching mode. An operation will be described wherein the molds 8 and 9 are opened/closed on the basis of the accleration/deceleration positions P0 to P3 stored as described above.

Figure 2B:
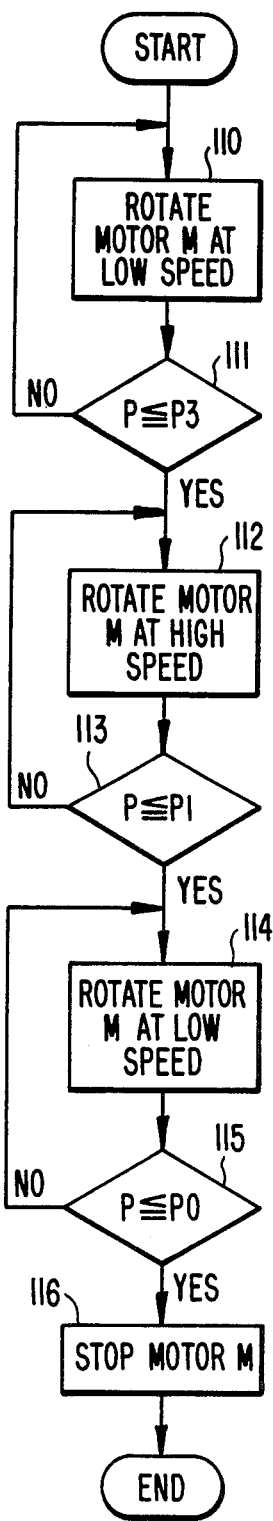
Figure 2C:
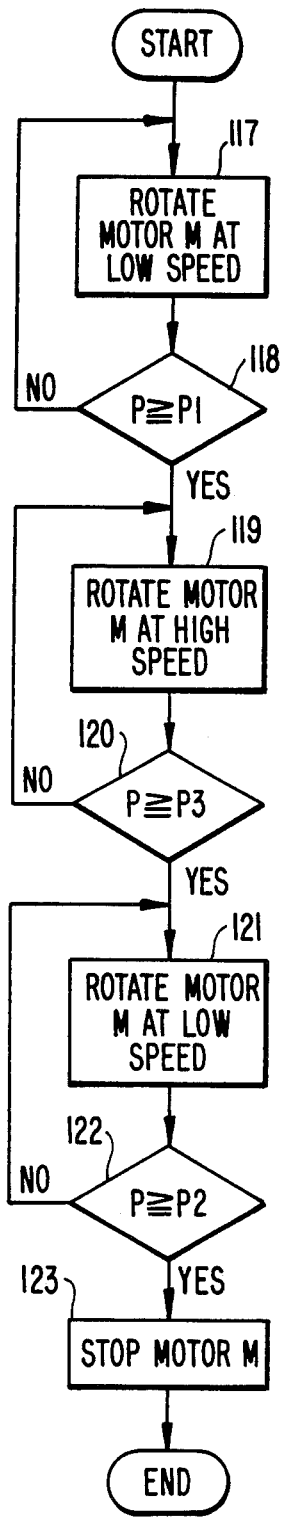

When a mold clamping instruction is generated, the CPU 12 drives the motor M at a low speed to accelerate the carrier 2, thereby moving the carrier 2 to the left in FIG. 1 (step 110), as shown in FIG. 2(b). The CPU 12 checks in step 111 whether or not the carrier 2 has reached the position P3 in accordance with the signal from the position sensor PC. If YES in step 111, the motor M is driven at a high speed, and the CPU 12 checks whether or not the carrier 2 has reached the position P1 (steps 112 and 113). When the CPU 12 determines that the carrier 2 has reached the position P1, the motor M is driven at a low speed; and when the carrier has reached the position P0, i.e., the origin, the servo motor M is stopped (steps 114, 115 and 116). Mold clamping is thus completed. For mold opening, as shown in FIG. 2(c), when a mold opening instruction is generated, the servo motor M is driven at a low speed until the molds are completely opened, i.e., the carrier 2 has reached the position P1 (steps 117 and 118). Subsequently, the carrier 2 is driven at a high speed up to the position P3 (steps 119 and 120). The servo motor M is driven at a low speed from the position P3 and stopped at the stop position P2 (steps 121, 122 and 123), thus completing mold opening.

What is claimed is:

1. A method of controlling a mold opening/closing speed in an injection apparatus in which molds are moved into and out of contact, comprising the steps of:
   (a) moving at least one of the molds at a first speed and storing at least one acceleration/deceleration position along the path of movement of the mold as the mold is moved during a teaching mode of operation;
   (b) opening/closing the molds during an operation mode, said opening/closing step comprising the steps of:
      (b1) detecting the position of the at least one of the molds along its path of travel;
      (b2) controlling the opening/closing speed of the at least one mold in accordance with the detected position of the at least one mold, by accelerating-/decelerating the opening/closing speed of the mold to accelerate or decelerate the mold when it is detected that the mold is passing the at least one acceleration/deceleration position.

2. A method according to claim 1, wherein said step (a) includes storing at least two acceleration/deceleration positions.

3. A method of setting acceleration and deceleration positions in an injection molding machine arranged to move a carrier mounted with a first mold relative to a base mounted with a second mold in accordance with a predetermined mold moving instruction, and to increase and decrease a predetermined moving speed of the carrier at at least one pair of acceleration and deceleration positions, said method comprising the steps of:
   (a) initiating movement of the carrier relative to the base at a predetermined speed in a teaching mode;
   (b) detecting a moving position of the carrier as the carrier is moved by executing said step (a); and
   (c) storing the moving position of the carrier detected in step (b) when a teaching device is manually operated, as a corresponding one of the at least one pair of acceleration and deceleration positions, whereby a corresponding one of increase and decrease of the predetermined speed of the carrier is executed when the carrier reaches the stored moving position as the carrier is moved in accordance with the mold moving instruction.

4. A method according to claim 3, wherein said step (c) comprises storing, when the teaching device is manually operated, the detected moving position as the deceleration position when the carrier is moved by the execution of said step (a) from a first position at which the first and second molds are brought into contact with each other to a second position at which the first and second molds are slightly separated from each other.

5. A method according to claim 4, further comprising the steps of:
   (d) storing the detected moving position of the carrier as a carrier stop position when the teaching device is manually operated and when, as a result of execution of said step (a), the carrier reaches a third position at which the first and second molds are opened; and
   (e) subtracting a predetermined value from the stored carrier stop position to calculate the acceleration position, and storing the calculated acceleration position.

6. A method according to claim 3, wherein in said step (a) the teaching mode is defined by a predetermined button being operated by the operator.

7. A method according to claim 4, wherein in said step (a) the teaching mode is defined by a predetermined button being operated by the operator.

8. A method according to claim 5, wherein in said step (a) the teaching mode is defined by a predetermined button being operated by the operator.

9. A method according to claim 3 wherein said step (a) comprises moving the carrier by driving a servomotor which acts as a drive source, and wherein said step (b) comprises detecting the moving position of the carrier by detecting a rotational position of the servomotor.

10. A method according to claim 4 wherein said step (a) comprises moving the carrier by driving a servomotor which acts as a drive source, and wherein said step (b) comprises detecting the moving position of the carrier by detecting a rotational position of the servomotor.

11. A method according to claim 5 wherein said step (a) comprises moving the carrier by driving a servomotor which acts as a drive source, and wherein said step (b) comprises detecting the moving position of the carrier by detecting a rotational position of the servomotor.

12. A method according to claim 3, wherein in said step (c) the manual operation of the teaching device is defined by actuating a predetermined key which acts as the teaching device.

13. A method according to claim 4, wherein in said step (c) the manual operation of the teaching device is defined by actuating a predetermined key which acts as the teaching device.

14. A method according to claim 5, wherein in said step (c) the manual operation of the teaching device is defined by actuating a predetermined key which acts as the teaching device.

* * * * *

UNITED STATES PATENT AND TRADEMARK OFFICE
CERTIFICATE OF CORRECTION

PATENT NO. : 4,781,872
DATED : NOVEMBER 1, 1988
INVENTOR(S) : YOSHIHARU INABA

It is certified that error appears in the above-identified patent and that said Letters Patent is hereby corrected as shown below:

Col. 1, line 19, "switch;" should be --switch,--;

line 32, "empty" should be --employ--;

line 49, delete "and".

Col. 4, line 22, "at" (first occurrence) should be --of the--.

Signed and Sealed this

Fourteenth Day of March, 1989

Attest:

DONALD J. QUIGG

*Attesting Officer*   *Commissioner of Patents and Trademarks*